CONVERSION OF RECTANGULAR CO-ORDINATES INTO POLAR CO-ORDINATES

Filed July 3, 1962

INVENTOR
JOHANNES A. BRAKEL
BY Frank R. Trifari
AGENT

United States Patent Office 3,180,977
Patented Apr. 27, 1965

3,180,977

CONVERSION OF RECTANGULAR CO-ORDINATES INTO POLAR CO-ORDINATES

Johannes Abraham Brakel, Hilversum, Netherlands, assignor to North American Philips Company, Inc., New York, N.Y., a corporation of Delaware Filed July 3, 1962, Ser. No. 207,226
4 Claims. (Cl. 235—189)

This invention relates to a co-ordinate converter for changing rectangular co-ordinates into polar co-ordinates. Such converters are used, for example, in analog computers for carrying out navigation and similar calculations.

The invention has for its primary object to provide such a co-ordinate converter can be built up of standard components with relative simplicity and one which has a short response time.

According to one aspect of the invention the converter comprises a resonant circuit formed by an inductor and a capacitor and means for exciting two 90° phase-shifted natural oscillations of the resonant circuit, the amplitudes of which correspond to the rectangular co-ordinates. A peak-value detector is provided for detecting the peak value of the composite oscillation formed by the two natural oscillations of the resonant circuit and a phase-measuring device is used for measuring the phase of the composite oscillation.

The invention will now be described more fully with reference to the drawing, wherein.

Figure 1:
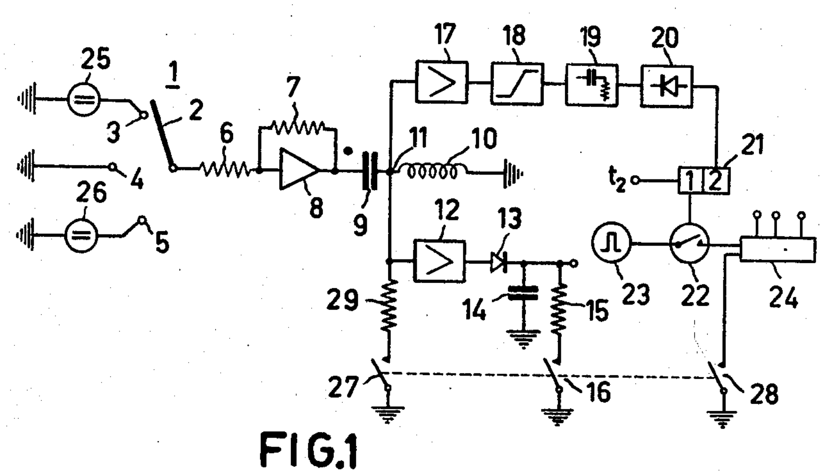
FIG. 1 shows partly in block diagram form an embodiment of a co-ordinate converter according to the invention.

The embodiment shown in FIG. 1 comprises a distributing switch 1 having a switch arm 2 and three contacts 3, 4 and 5, co-operating with the switch arm. In practice the distributing switch 1 is preferably an electronic switch, whose function is the same as that shown. The switch is adapted to connect, under the control for a control-circuit (not shown), in order of succession the contacts 3, 4, and 5 through the switch arm 2 and the resistor 6 to the input of a direct-voltage amplifier 8, negatively fed back by a resistor 7. The output of the amplifier 8, which has a very low impedance, is connected to a resonant circuit formed by a capacitor 9 and an inductor 10, which circuits is shown as a series resonant circuit. The functioning of the elements of FIG. 1 to the left of switch 1 will be more fully described below.

Figure 2:
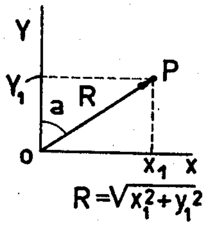
FIG. 2 shows a co-ordinate system.

In the resonant circuit two 90° phase-shifted natural oscillations are produced, the amplitudes of which are proportional to the rectangular co-ordinates of an object. FIG. 2 shows a rectangular co-ordinate system X–O–Y with an object at point P, the rectangular co-ordinates of which are indicated by $X_1$ and $Y_1$. The radius R of point P to the origin O of the co-ordinate system is given in the formula of FIG. 2 as a function of the rectangular co-ordinates of point P. The formula indicates that the square of the radius is equal to the sum of the squares of the rectangular co-ordinates. The natural oscillations produced in the resonant circuit together constitute a total or composite oscillation, the square of the amplitude of which is equal to the sum of the squares of the amplitudes of the two oscillations. The amplitude or the peak value of the total oscillation is therefore proportional to the radius. The total oscillation is fed from the junction 11 of the capacitor 9 and the inductor 10 through a separation amplifier 12 to a peak-value detector formed by a diode 13 and a capacitor 14. The capacitor 14 is charged up to the peak value of the total oscillation, so that a voltage proportional to the radius is available at the output of the detector. This information can then be further processed in a manner not shown, after which the capacitor 14 is discharged through a resistor 15 and a switch 16.

The phase of the composite oscillation of the resonant circuit depends upon the ratio between the amplitudes of the individual oscillations and, providing for a constant, is equal to the angle between the radius of point P of FIG. 2 and a co-ordinate axis. The phase of the composite oscillation is measured in the following manner. The composite oscillation is fed via an amplifier 17 to a peak limiter 18 and then differentiated by a differentiating circuit 19. The output signal of the circuit 19 consists of pulses coinciding with the zero passages of the composite oscillation. The negative pulses are selected by the pulse selector 20. The measuring of the phase is accomplished by counting the pulses of a pluses source between a fixed start time and, for example, the first output pulse of the pulse selector 20. For this purpose, provision is made of a bistable trigger circuit 21, which is switched to the position 1 at a fixed start time and which then closes a switch 22, thus feeding the pulses of the pulse source 23 to a counting circuit 24. The first pulse of the pulse selector 20 switches the trigger circuit 21 to the position 2, and the switch 22 is then opened. The state of the counting circuit 24 then corresponds to the phase of the composite oscillation, so that the angle between the radius and the co-ordinate axis can be read at the calibrated output of the counting circuit 24. This information can then be further processed in any desired manner after which the counting circuit is switched to the rest position by closing a switch 28. The rapid phase measuring described has the advantage of a very short response time for the co-ordinate converter.

The excitation of two 90° phase-shifted natural oscillations of the resonant circuit may be accomplished in various ways; both a series resonant circuit and a parallel resonant circuit may be employed to this end, and the excitation of the two natural oscillations may be carried out at the same time or in order of succession with a time shift of one quarter of a period relatively to each other. Without restricting the invention to a particular method of excitation of the natural oscillations, a method will be described with reference to the embodiment shown, which has been found to be preferable.

The contact 3 of the switch 1 is connected to a direct-voltage source 25, the terminal voltage of which is equal to the co-ordinate $Y_1$ of point P in FIG. 2. The terminal voltage of the source 25 is then equal to $Y_1$. The contact 5 of the switch 1 is connected to a direct-voltage source 26, the terminal voltage $-X_1$ of which is equal to the co-ordinate $X_1$ of point P with opposite polarity. The relative polarities of the sources 25 and 26 are arbitrary in the positive co-ordinate directions and are chosen to be of opposite polarity in order to excite natural oscillations having the same initial direction for $X_1$ and $Y_1$ both positive or both negative.

Figure 3:
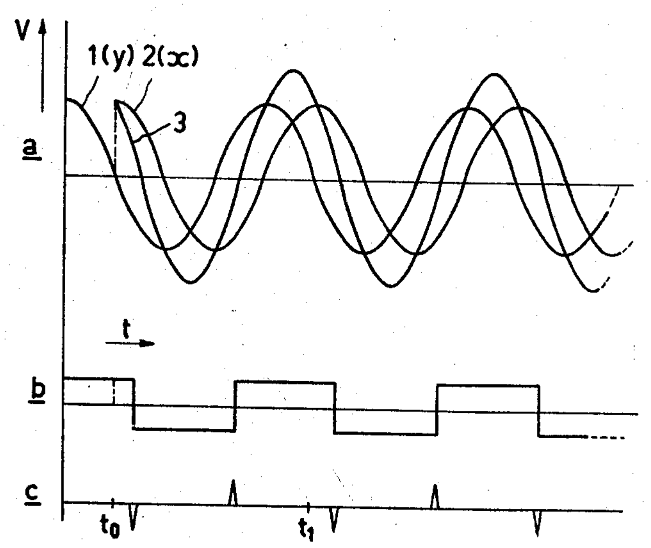
FIG. 3 shows a few voltage-time diagrams for explaining the embodiment shown in FIG. 1.

Under the control of a control-circuit (not shown) the switch arm 2 is connected to contact 3 and the switches 16, 27 and 28 are closed. The switch 28 moves the counting circuit 24 into the start position and the switch 16 discharges the capacitor 14. The switch 27 connects a resistor 29 in parallel with the inductor 10, so that the resonant circuit is strongly damped. The capacitor 9 is charged to the voltage $-Y_1$ via the direct-voltage amplifier 8, which changes over the polarity of the supplied signal. The dot at the capacitor indicates the chosen positive side of the capacitor with a positive voltage. After the capacitor 9 has been charged, the switches 16, 27 and 28 are opened and the switch arm 2 is connected to ground by being connected to the contact 4. The switch 27 then cuts out the damping resistor 29 of the resonant circuit. The capacitor 9 is then discharged via the inductor 10 and the very low output impedance of the direct-voltage amplifier 8, so that a natural oscillation of the resonant circuit is excited and the energy of the capacitor is periodically transferred from the capacitor to the inductor and from the inductor to the capacitor. This natural oscillation is indicated in FIG. 3*a* by a curve 1 (Y), which indicates the voltage of point 11 of the resonant circuit to ground from the instant when the switch arm 2 is connected to the contact 4. The amplitude of the oscillation is equal to $Y_1$. Then, after one quarter of a period of the natural oscillation, at which time the voltage at the capacitor is zero and all energy of the resonant circuit is stored in the inductor, the switch arm 2 is connected to the contact 5. As a result the voltage of the source 26 appears with opposite polarity in series with the capacitor and the inductor, so that a second natural oscillation is excited.

This oscillation is indicated in FIG. 3*a* by a curve *s*(X), which indicates the voltage at point 11 of the resonant circuit to ground for this natural oscillation from the instant $t_0$, when the switch arm 2 is connected to the contact 5. The amplitude of this oscillation is equal to $X_1$. The composite oscillation composed of the two natural oscillations is indicated by a curve 3.

FIG. 3*b* illustrates the output signal of the peak limiter 18 and FIG. 3*c* the output signal of the differentiating circuit 19. The pulse selector 20 selects therefrom the negative pulses. The peak value of the composite oscillation is determined in the manner described above. The phase can be measured by counting the pulses from the pulse source 23 between the fixed start time $t_0$ and the next-following output pulse of the pulse selector 20 or by counting the pulses between the instant shifted by one period of the natural oscillation with respect to $t_0$ and the next-following pulse of the pulse selector 20. For this purpose, the trigger circuit 21 is switched to the position 1 at the instant time $t_1$. The difference in time between $t_1$ and the next-following pulse from the pulse selector 20 is zero when $X_1$ is zero and is one quarter of the period of the natural oscillation when $Y_1$ is zero. The time interval concerned corresponds to the angle *a* between the radius to point P of FIG. 2 and the Y-axis.

A considerable advantage of the co-ordinate converter described is that the two natural oscillations can be produced with the use of one negatively fed-back direct-voltage amplifier.

It should be noted that, while the two natural oscillations in the embodiment shown in FIGURE 1 are excited by means of a single amplifier with voltage feedback acting as a voltage source in series with the resonant circuit, it is also possible to excite the natural oscillations by means of a single amplifier with current feedback acting as a current source in parallel with the resonant circuit. In practice however the method shown in FIG. 1 is preferred because a voltage source having a low internal impedance can be more readily realized than a current source having a high internal impedance.

It should also be noted that the two natural oscillations can be excited simultaneously by means of a voltage source acting in series with the resonant circuit and a current source acting in parallel with the resonant circuit, the initial phase difference between the two natural oscillations being a quarter of a period in this case. This method, however, is less preferred since a voltage fed-back amplifier as well as a current fed-back amplifier must be employed.

The co-ordinate converter described above permits the determination of both the peak value and the phase of the composite oscillation within 1 and ¼ periods of the natural oscillation, so that the response time is short. For example, with a frequency of the natural oscillation of 500 c./s., the response time is of the order of 2.5 msec.

It is to be understood that the invention may be practiced other than as specifically described without departing from the inventive concept, the scope of which is set forth in the appended claims.

What is claimed is:

1. A co-ordinate converter for converting rectangular co-ordinates into polar co-ordinates, comprising: a resonant circuit including an inductor and a capacitor, means for exciting two 90° phase-shifted natural oscillations of the resonant circuit, the amplitudes of said oscillations corresponding to rectangular co-ordinates, a peak-value detector for detecting the peak value of the composite oscillation composed of said two oscillations, and a phase-measuring device for measuring the phase of the composite oscillations.

2. A co-ordinate converter for converting rectangular co-ordinates into polar co-ordinates, comprising: a resonant circuit including an inductor and a capacitor, means for exciting two 90° phase-shifted natural oscillations of the resonant circuit, the amplitudes of said oscillations corresponding to rectangular co-ordinates, a peak-value detector for detecting the peak value of the composite oscillation composed of said two oscillations, and a phase-measuring device for measuring the phase of the composite oscillation, said phase-measuring device including a pulse source and a counter for counting the number of pulses emanating from said pulse source between a fixed time and a time of zero passage of the composite oscillation.

3. A co-ordinate converter for converting rectangular co-ordinates into polar co-ordinates, comprising: a resonant circuit including an inductor and a capacitor, means for charging the capacitor to a first direct voltage corresponding to the amplitude of a first rectangular co-ordinate, circuit means for discharging the capacitor through the inductor, thereby exciting a first natural oscillation in the resonant circuit, means for charging the capacitor to a second direct voltage corresponding to the amplitude of a second rectangular co-ordinate after one-quarter of a period from the time of excitation of the first natural oscillation, thereby exciting a second natural oscillation in the resonant circuit, a peak-value detector for detecting the peak value of the composite oscillation composed of said two oscillations, and a phase-measuring device for measuring the phase of the composite oscillation.

4. A co-ordinate converter for converting rectangular co-ordinates into polar co-ordinates, comprising: a resonant circuit including an inductor and a capacitor, means for charging the capacitor to a first direct voltage corresponding to the amplitude of a first rectangular co-ordinate, circuit means for discharging the capacitor through the inductor, thereby exciting a first natural oscillation in the resonant circuit, means for charging the capacitor to a second direct voltage corresponding to the amplitude of a second rectangular co-ordinate after one-quarter of a period from the time of excitation of the first natural oscillation, thereby exciting a second natural oscillation in the resonant circuit, a peak-value detector for detecting the peak value of the composite oscillation composed of said two oscillations, and a phase-measuring device for measuring the phase of the composite oscillation, said phase-measuring device including a pulse source and a counter for counting the number of pulses emanating from said pulse source between a fixed time and a time of zero passage of the composite oscillation.

No references cited.

MALCOLM A. MORRISON, *Primary Examiner.*

UNITED STATES PATENT OFFICE

CERTIFICATE OF CORRECTION

Patent No. 3,180,977 April 27, 1965

Johannes Abraham Brakel

It is hereby certified that error appears in the above numbered patent requiring correction and that the said Letters Patent should read as corrected below.

Column 1, line 15, after "converter" insert -- which --; column 2, line 17, for "pluses" read -- pulse --.

Signed and sealed this 23rd day of November 1965.

(SEAL)
Attest:

ERNEST W. SWIDER
Attesting Officer

EDWARD J. BRENNER
Commissioner of Patents